Nov. 10, 1942.　　A. VENDITTY　　2,301,346
JOINT CONSTRUCTION
Filed Jan. 13, 1941
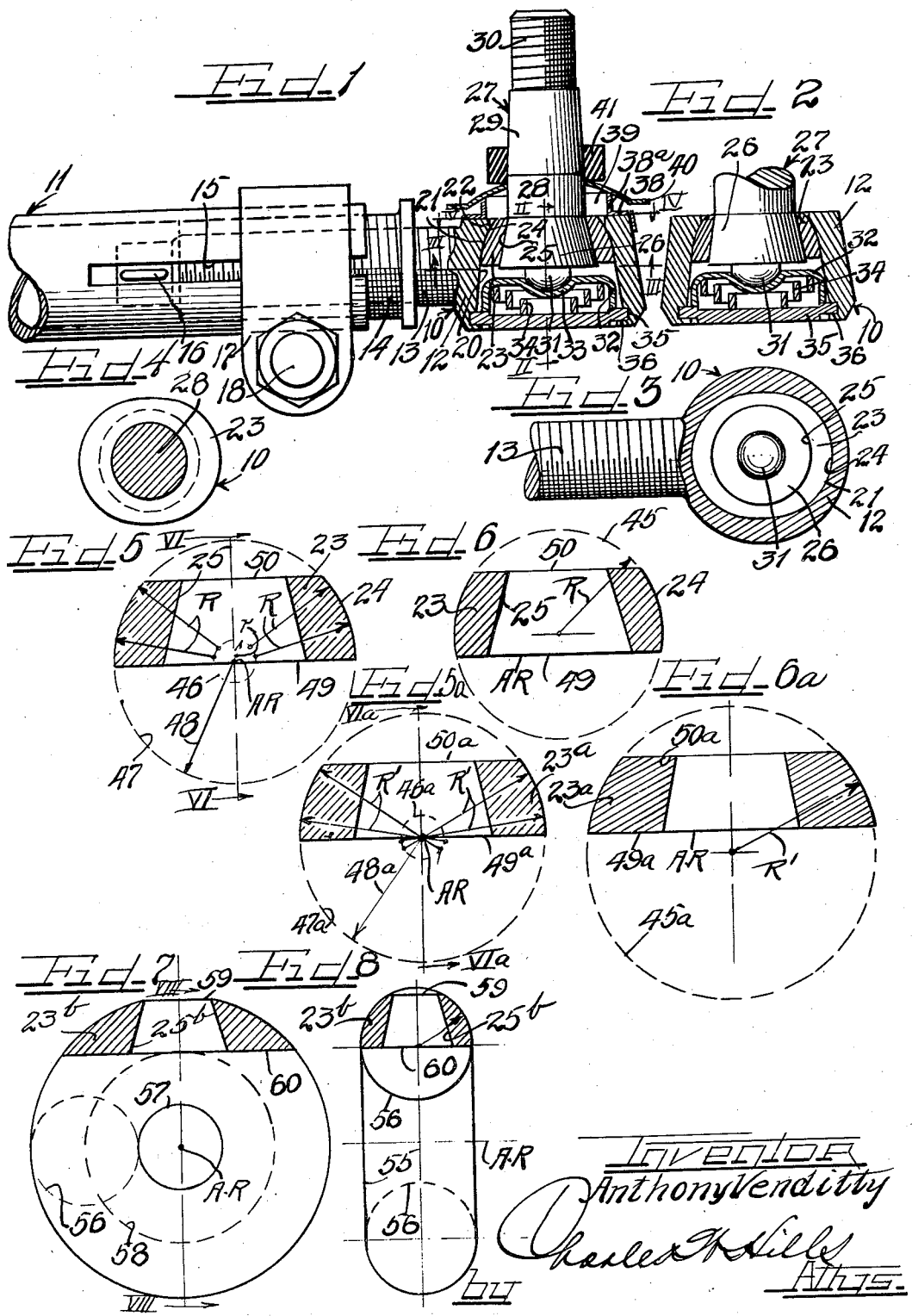

Patented Nov. 10, 1942

2,301,346

UNITED STATES PATENT OFFICE 2,301,346

JOINT CONSTRUCTION

Anthony Venditty, Detroit, Mich., assignor to Thompson Products Incorporated, Cleveland, Ohio, a corporation of Ohio Application January 13, 1941, Serial No. 374,166

4 Claims. (Cl. 287—90)

This invention relates to joint constructions having relatively movable parts with cooperating bearing surfaces shaped to permit swiveling or tilting movements of the parts while preventing rotation of the parts.

More specifically, this invention relates to tie rod joints having cooperating oblate toroidal bearing surfaces.

In universal type joints it is frequently desirable to permit free angulation of the relatively movable joint parts while at the same time holding the joint parts against rotation about their own axes. In some universal joints angular movements of the relatively movable parts are borne on one pair of cooperating bearing surfaces while rotational movements are borne on another pair of cooperating bearing surfaces. In order to insure a shifting of relative movement from one pair of bearing surfaces to the other pair immediately upon change of angular movements to rotational movements, it has heretofore been necessary to use additional locking means. The locking means prevented relative rotation of that pair of bearing surfaces which permitted relative angular movements.

According to the present invention the heretofore required locking means are dispensed with and the surfaces permitting angular movements are so shaped that they cannot rotate. The second pair of bearing surfaces permitting the rotational movements is then automatically brought into operation immediately upon application of rotating forces. At the same time the cooperating pair of bearing surfaces which permit the rotating movements will not permit tilting movements of the parts.

In accordance with this invention a bearing socket and its cooperating bearing are so shaped that relative angular movements therebetween are readily permitted but at the same time rotational movements are prevented. The bearing in the socket preferably has a frusto-conical bore therethrough receiving the frusto-conical head of a stud. The stud can thus rotate about its own axis in the bore of the bearing but any tilting movements of the stud can only be accommodated on the socket bearing surface and the cooperating outer surface of the bearing.

A specific example of a shape for the cooperating bearing socket and movable bearing or seat in the socket is an oblate toroidal shape. This shape is a section of a torous cut by a plane parallel to the axis of rotation of the generating circle at the center of the generating circle. If the torous is visualized in its best-known form as a doughnut, the operative section for the joints of this invention is an outer peripheral portion of the doughnut cut therefrom by a chord in spaced relation from the axis of revolution of the doughnut.

The torous of the doughnut type having a hole through the center thereof yields an outer peripheral section which is very oblate. Oblate shapes of the type resisting rotational movements can also be provided by a torous which is a complete solid and which has the generating circle overlapping itself as it is moved around its axis of rotation. A solid torous of this nature produces an oblate peripheral section which is more circular than the oblate section produced by a torous of the doughnut type.

It is, then, an object of this invention to provide joints having relatively movable parts with cooperating bearing surfaces shaped to permit tilting movements of the parts in all planes while preventing rotation of the parts.

Another object of the invention is to provide a universal type joint having one pair of cooperating bearing surfaces shaped to permit tilting movements in all planes and another pair of bearing surfaces shaped to permit rotating movements, with each pair of bearing surfaces being incapable of permitting the type of movement designated for the other bearing surface.

A specific object of this invention is to provide a tie rod joint having a socket, an apertured bearing member in said socket, and a headed stud extending through the bearing member wherein the socket and the bearing member have cooperating surfaces permitting tilting movements of the parts in all planes while preventing movement of the parts about their own axes.

A further specific object of this invention is to provide a tie rod joint having socket with a toroidal oblate bearing surface, a frusto-conical apertured bearing member having a cooperating bearing surface engaging the socket, and a frusto-conical headed stud extending through the bearing member.

Other and further objects of the invention will become apparent to those skilled in the art from the following detailed description of the annexed sheet of drawings which discloses a preferred embodiment of the invention.

On the drawing:

Figure 1 is a fragmentary side elevational view of an end of a tie rod having a joint according to this invention mounted thereon and partially shown in vertical cross section.

Figure 2 is a fragmentary vertical cross-sectional view taken along the line II—II of Figure 1.

Figure 3 is a horizontal cross-sectional view taken along the line III—III of Figure 1.

Figure 4 is a horizontal cross-sectional view taken along the line IV—IV of Figure 1.

Figure 5 is a diagrammatic side view illustrating the generation of a toroidal oblate bearing ring for the joint shown in Figures 1 to 4 from one form of solid or non-apertured torous.

Figure 5a is a diagrammatic side view similar to Figure 5 but illustrating another manner of generating a toroidal oblate bearing ring for the joint shown in Figures 1 to 4 from another form of solid or non-apertured torous.

Figure 6 is a view taken in a plane at right angles to Figure 5 along the line VI—VI of Figure 5.

Figure 6a is a view similar to Figure 6 but taken in a plane at right angles to Figure 5a along the line VIa—VIa of Figure 5a.

Figure 7 is a side view diagrammatically illustrating the generation of a toroidal oblate bearing ring from a torous of the doughnut type.

Figure 8 is a view taken in a plane at right angles to Figure 7 along the line VIII—VIII of Figure 7.

As shown on the drawings:

In Figures 1 to 4 the reference numeral 10 designates generally a tie rod joint or tie rod end according to this invention mounted on a tie rod 11.

The joint 10 includes a socket or housing 12 having a laterally extending threaded shank portion 13. An adapter sleeve 14 is threaded around the shank 13 and is, in turn, threaded into the tie rod 11. The tie rod 11 is slotted as at 15 and a pin 16 can extend through the end of the shank 13 which projects beyond the sleeve 14 for seating into the slot 15.

A split clamping ring 17 is disposed over the tie rod 11 and tightened thereon by means of a clamping nut and bolt assembly 18 to contract the tie rod around the sleeve 14 thereby holding the sleeve in fixed threaded position. The shank 13 cannot turn in the sleeve 14 when the pin 16 is in place since the pin will engage the slot 15 to resist turning movement. As a result the housing 12 can be fixedly carried by the tie rod 11 and can be adjusted toward and away from the end of the tie rod by loosening the clamp 17 to permit rotation of the sleeve 14 in the tie rod or by removal of the pin 16 to permit rotation of the shank 13 in the sleeve 14.

The housing 12 has an oblate tapered bore 20 extending from the bottom thereof into spaced relation from the top and merging into a toroidal oblate bearing surface 21 which converges to the top of the housing to define an oblate open top 22.

A bearing ring or seat 23 has a toroidal oblate outer bearing surface 24 cooperating with the housing bearing wall 21. The bearing seat is thus adapted to tilt in the housing but, due to the oblate shapes of the cooperating bearing surfaces, the seat cannot rotate about its own axis.

The seat 23 has a frusto-conical bore 25 therethrough receiving the frusto-conical head 26 of a stud 27 in free rotatable relation. The stud 27, as best shown in Figure 1, has a cylindrical portion 28 extending above the top of the housing 12, a tapered intermediate portion 29 adapted to receive the eye end of a connecting arm (not shown) and a cylindrical threaded free end 30 adapted to receive a locking nut thereon, (not shown).

The bottom of the stud 27 has a centrally projecting rounded lug or bottom 31 seated in a cap member 32 which is mounted in the bore 20 and has a centrally depressed portion 33 for receiving the lug 31. A ribbon coiled spring 34 is held under compression between the cap 32 and a closure plate 35 which is peened or spun into the bottom of the housing 12 as at 36.

The stud is thus urged toward the open top 22 of the housing and the frusto-conical head 26 of the stud urges the seating ring 23 into full cooperating bearing relation with the housing bearing surface 21. The stud can rotate about its own axis on the bearing surfaces provided by the frusto-conical head thereof and by the tapered bore 25 in the seating ring. The stud can tilt in all planes relative to the housing 12 on the cooperating bearing surfaces 21 of the housing and 24 of the seating ring. Since these cooperating bearing surfaces are oblate in shape, the seating ring cannot rotate in the housing and all rotating movements must be borne by the inner pair of bearing surfaces provided by the stud head and by the bore through the seating ring. No means are required for locking the seating ring against rotation since the outer bearing surface of the seating ring and the bearing surface of the housing will insure this locking.

The open top 22 of the housing can be closed by means of a dust cap comprising a cap member 38 snapped over the top of the housing and having an upturned annular flange 38a defining a large opening 39 through which the stud can project. A dished cap member 40 is centrally apertured to snugly engage the cylindrical portion 28 of the stud and extends over the flange 38a of the cap. A resilient washer 41 is snugly mounted around the stud 27 and held under compression by the connecting arm (not shown) which is mounted on the stud for holding the cover to ride against the flange 38a thereby effecting a seal.

As shown in Figures 5 and 6 the bearing ring 23 can be generated from a closed or solid torous which is produced by movement of a generating circle 45 (Figure 6) having a radius R around the path 46 (Figure 5) and about an axis of revolution A. R. lying in the plane of the circle 45. The closed torous may also be visualized as the enevelope of an infinite number of spheres of equal radii R that may have their centers on a circle 46 of radius $r$. In the plane shown in Figure 5 the path 47 of the generating circle 45 of Figure 6 only shows as a circle of radius 48 struck from the axis of revolution A. R. but, in the solid torous, the generating circle 45 of Radius R actually has the center thereof moved around the path 46 and the radius R is the shortest that can be struck from the path 46 to produce the circle 45. Thus the path 47 in the plane of Figure 5 is a larger circle than the generating circle 45 of Figure 6.

The bearing ring 23 is cut from the resulting generated solid torous by a plane 49 parallel to the axis of rotation A. R. of the generating circle at the center of the generating circle. The outer peripheral portion of the thus cut section is cut flat by a plane 50 parallel to the plane 49. In other words the torous is sliced by planes 49 and 50 to remove a peripheral portion on one side of the axis of revolution of the torous. This removed section is then provided with a tapered bore 25 and has the toroidal oblate external surface 24 described in Figures 1 to 4.

Figures 5a and 6a are similar to Figures 5 and 6 respectively, but illustrate another form of closed or solid torous from which a bearing ring 23a can be formed. The torous of Figures 5a and 6a is produced by movement of a generating circle 45a (Figure 6a) of longer radius R' around the path 46a so that the radius overlaps the path as shown in Figure 5a. The radius R' is longest that can be struck from the path 46a to produce the circle 45a, and the circular path 47a of radius 48a in the plane of Figure 5a is thus smaller than circle 45a in the plane of Figure 6a. The planes 49a and 50a cut the ring 23a from the resulting torous.

Figures 7 and 8 illustrate the generation of the toroidal oblate bearing surface for the ring 23 in a little clearer manner by disclosing the customary form of doughnut type torous. In this type the generating circle does not overlap the periphery of the circle around which it rotates as it does in Figures 5, 5a, 6 and 6a.

In Figure 7 the torous 55 is generated by rotating a generating circle 56 around the axis of revolution A. R. lying in the plane of the circle or around the periphery of another circle 57. This produces the usual doughnut shape and the center of the generating circle 56 will move around the path illustrated at 58.

The bearing ring 23b is cut from the torous 55 by parallel planes 59 and 60 which are parallel to the axis of revolution A. R. The plane 60 is at the center of the generating circle 56. Thus the bearing ring 23b is an outer peripheral section of the torous 55 taken at one side of the center of the torous.

The frusto-conical bore 25b is cut through the section 23b to produce the bearing ring. As shown in the plane of Figure 7, the bearing ring 23b will have an oblate shape and, as shown in Figure 8, the bearing ring 23b will have a true circular shape in a plane at right angles to the plane shown in Figure 7.

The oblate shape shown in Figure 7 is quite pronounced and therefore a solid torous of the type shown in Figures 5 and 6 is preferably used for generating the bearing ring.

All external surfaces of the bearing ring of course are circular but the axis of the generating circle is shifted so as to produce the oblate shape which resists rotation of the bearing ring in the housing.

From the above description it should be understood that this invention now provides a joint with cooperating bearing surfaces which only permit relative tilting movements and which resist rotating movements. A specific embodiment of the invention includes the provision of a second pair of bearing surfaces which permit the rotating movements and thereby provide a universal type joint. Since the cooperating bearing surfaces which permit the tilting movements are in full engagement with each other, being generated from circles, even wear of the bearing surfaces is insured.

In tie rod joints having toroidal oblate-shaped bearing surfaces according to this invention the long axis or major axis of the bearing surfaces is parallel with the shank of the joint housing so that tilting movements of the stud in this plane are permitted throughout a wide angle.

All of the bearing surfaces converge in the same direction so that the spring will compensate for wear of these bearing surfaces and will always hold the same in full bearing engagement with each other.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint comprising movable members having bearing walls in cooperating relation and each bearing wall having a toroidal oblate shape for relative angulation of the members in all planes while resisting relative rotation of the members.

2. A joint comprising a socket having an internal toroidal oblate bearing wall, a stud projecting from said socket having a bearing portion in said socket with an external toroidal oblate bearing wall in seated engagement with the bearing wall of the socket, and means for urging said bearing portion into said seated engagement.

3. A tie rod joint comprising a housing having an inwardly converging internal bearing wall of toroidal oblate shape, a bearing ring in said housing having a complementary shaped external bearing wall and a frusto-conical aperture therethrough converging in the same direction as the external bearing wall, a stud having a frusto-conical head seated in said aperture of the bearing and extending from said housing, and spring-urged means acting against said stud for holding the stud and bearing ring in the housing in assembled relation whereby said stud can rotate freely about its own axis on the frusto-conical bearing walls and whereby said stud can carry the bearing for free angulation relative to said housing.

4. A tie rod joint comprising a socket having a laterally extending shank for mounting in a tie rod, said socket having a bore therethrough with an inwardly converging bearing wall of toroidal oblate shape defining a restricted opening to the housing, a bearing ring in said housing having a complementary toroidal oblate shaped external bearing wall tiltable throughout a wide angle in the plane of the housing shank and tiltable through a narrower angle in a plane normal to the housing shank, said bearing ring having a frusto-conical bore therethrough, and a stud extending through said ring having a frusto-conical head in engagement with said bore whereby said stud can rotate about its own axis within the bearing ring.

ANTHONY VENDITTY.